US 007844608B2

(12) United States Patent
Natkovich et al.

(10) Patent No.: US 7,844,608 B2
(45) Date of Patent: Nov. 30, 2010

(54) CLUSTERED QUERY SUPPORT FOR A DATABASE QUERY ENGINE

(75) Inventors: Olga Natkovich, Santa Clara, CA (US); Jonathan Cao, Sunnyvale, CA (US); Alan Gates, Danville, CA (US)

(73) Assignee: Yahoo! Inc., Sunnyvale, CA (US)

( * ) Notice: Subject to any disclaimer, the term of this patent is extended or adjusted under 35 U.S.C. 154(b) by 465 days.

(21) Appl. No.: 11/615,899

(22) Filed: Dec. 22, 2006

(65) Prior Publication Data

US 2008/0147627 A1 Jun. 19, 2008

Related U.S. Application Data

(60) Provisional application No. 60/870,368, filed on Dec. 15, 2006.

(51) Int. Cl.
*G06F 7/00* (2006.01)
(52) U.S. Cl. ........................................ 707/737; 707/800
(58) Field of Classification Search ................. 715/511; 707/708, 737
See application file for complete search history.

(56) References Cited

U.S. PATENT DOCUMENTS

| | | | | |
|---|---|---|---|---|
| 6,848,078 B1 * | 1/2005 | Birsan et al. | ................ | 715/206 |
| 2005/0071349 A1 * | 3/2005 | Jordan et al. | ................ | 707/100 |
| 2008/0114803 A1 * | 5/2008 | Chinchwadkar et al. | .... | 707/102 |

* cited by examiner

*Primary Examiner*—Charles Rones
*Assistant Examiner*—Belix M Ortiz
(74) *Attorney, Agent, or Firm*—Frommer Lawrence & Haug LLP; Jamie L. Wiegand (57) ABSTRACT

A device, system, and method are directed towards combining a plurality of queries to a database into a combined execution plan. The plurality of queries is received. The queries may be Structured Query Language (SQL) statements. The database may be a relational database. The plurality of queries is transformed into a plurality of parse trees. A determination is made whether the plurality of queries operates on at least the same portion of the same table. If so, then the plurality of query trees is query-optimized. The plurality of query trees are combined into a master query tree based on similar nodes in the plurality of query trees. A split node in the master query tree represents non-similarities between the plurality of query trees. The master query tree is transformed into an execution plan. The execution plan is applied to a database to return at least one result.

20 Claims, 9 Drawing Sheets

CLUSTERED QUERY SUPPORT FOR A DATABASE QUERY ENGINE

CROSS-REFERENCE TO RELATED APPLICATIONS

This application claims the benefit of U.S. Provisional Application No. 60/870,368 filed Dec. 15, 2006, the benefit of the earlier filing date of which is hereby claimed under 35 U.S.C. §119(e).

TECHNICAL FIELD

The present invention relates generally to providing data from a database and, more particularly, but not exclusively to optimizing a database query.

BACKGROUND

Organizations often must manage a large volume of data. The data may be stored in data warehouses. These data warehouses may store up to terabytes of data. Accordingly, efficient mechanisms for managing the data are needed.

These data warehouses may be implemented as a database system. One type of database system is known as a relational database (RDB) or a relational database management system (RDBMS), which organizes data into tables. The tables may have rows that represent individual entries or records in the database, and the columns of the tables may define what is stored in each entry or record.

A database query is used to retrieve information from the database system. The database query typically includes one or more expressions interconnected with operators. The database query usually defines conditions and/or logical operates to be applied to at least one column of at least one table. The database is searched for records that satisfy the query, and the records are returned as a query result, also referred to simply as a "result" or a "dataset." The database query is normally written in a query language. The query language defines a syntax for generating and processing queries that is independent of the actual structure and format of the database.

To process a database query, a database system typically parses the database query based on a grammar for the appropriate query language. The parsed database query may be stored as a tree representation called a parse tree. The parse tree may also be transformed into a relational algebra expression. The relational algebra expression may also be stored as a tree. The relational algebra expression may include a plurality of operators on sets of data. Common relational algebra operators include set operators, including set unions and set differences, natural joins, or other types of joins, antijoins, projections, selections, divisions, or the like. The relational algebra expression may be represented as a graph, a tree, or the like. The relational algebra expression (tree) may then be used to produce an execution plan, which describes particular steps to be taken by a computing device to produce the requested result. The execution plan may also be stored and represented as a tree. The nodes of the execution plan tree may include execution parts or operators, including the operators: scan, join, ordering, grouping, aggregation, subquery, derived table/common table expressions, or the like. Some database systems may produce the execution plan directly from the parse tree. Other database systems may query-optimize the relational algebra tree and/or execution plan tree to produce more efficient usage of resources.

The relational algebra tree and/or execution plan tree may be query-optimized using a query optimizer. The query optimizer is a component of a database management system that determines an efficient way to execute a database query. The query optimizer may consider the costs (e.g., CPU, network, or disk access costs) of performing different execution plans for the same operation defined by the database query, or the like. Different execution plans may include different possible execution parts and/or ordering of the execution parts. The execution parts may include a variety of operates, including different access paths (e.g., index scan, sequential scan), join algorithms (e.g., sort-merge join, hash join, nested loops), or the like. The query optimizer may determine the execution plan that minimizes costs.

While a query optimizer and/or other components of a database system may make an individual database query more efficient, each individual database query may consume significant resources, especially when the database system must manage a large volume of data. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The terms "database" or "database system" refer to any mechanism for storing, managing and providing data, including relational database systems, hierarchical database systems, object oriented database systems, or the like.

The term "query language" refers to any definition of statements used for specifying a retrieval and/or manipulation of a data source, including Structured Query Language (SQL), QUEL, Object Query Language (OQL), Multidimensional Expression (MDX), Data Mining Extension (DMX), Datalog, or the like. The terms "database query" or simply "query" refer to a statement written in a query language for retrieving and/or manipulating a data source.

As used herein, the term "tree" refers to any data structure of interconnected nodes. The interconnection between the nodes may be referred to as "edges", "links," "connections" or the like. Edges may be directed. The term "tree," as used herein, may also refer to a graph where a node of a tree may have a fan-in and/or fan-out of greater than one. In one embodiment, a tree may be a directed acyclic graph. A tree may have at least one head node (e.g., a node with no parent node). A tree may also have a plurality of leaf nodes (e.g., a node with no child nodes). The term "sub-tree" refers to at least one node within the tree, optionally interconnected to at least one other node within the tree. The term "path" refers to a plurality of nodes in a tree, wherein each node is connected to at most one other node.

The term "query tree" refers to a tree associated with a database query. The nodes of the tree may represent operators, and the links may represent the sequence in which to perform the operators. A query tree may store information about a parse tree representation of the database query, a relational algebra representation of the database query, an execution plan representation of a database query, or the like. The term "parse tree" refers to a tree generated by applying a grammar of a database query language to a database query.

The term "query-optimize" refers to any method, process, or technique for selecting at least one representation of a database query from a plurality of possible representations of the database query, wherein the selected representation is determined to be executable against a database in a more efficient fashion than the other possible representations.

Briefly stated the various embodiments are directed towards combining a plurality of queries of a database into a combined execution plan. The plurality of queries is received. In one embodiment, the queries may be Structured Query Language (SQL) statements. In one embodiment, the database may be a relational database. The plurality of queries is transformed into a plurality of parse trees. A determination is made whether the plurality of queries operates on at least a same portion of a same table. If so, then the plurality of query trees is query-optimized. The plurality of query trees are combined into a master query tree based on similar nodes in the plurality of query trees. A split node in the master query tree represents non-similarities between the plurality of query trees. The master query tree is transformed into an execution plan. The execution plan is applied to a database to return at least one result.

Illustrative Operating Environment

Figure 1:
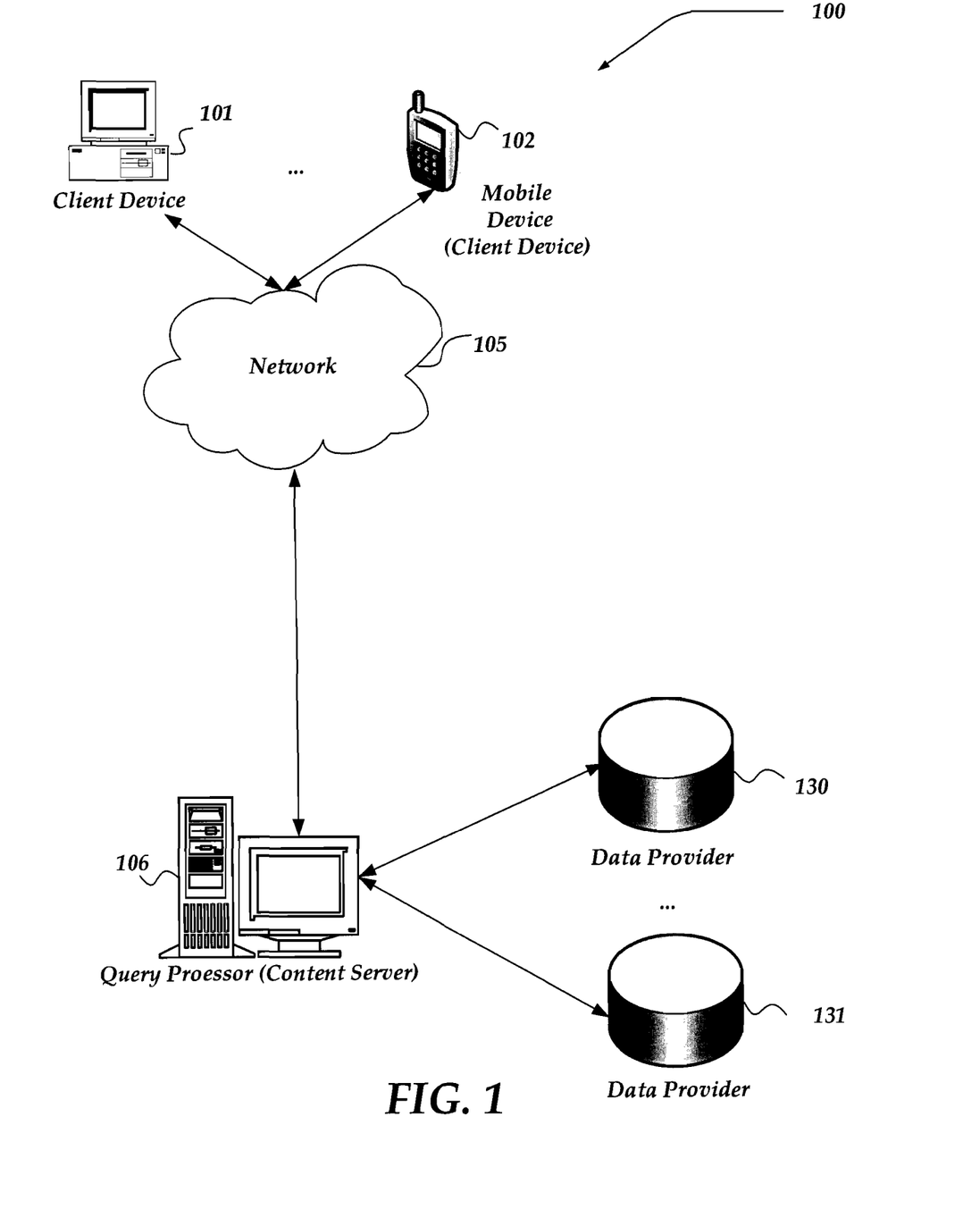
FIG. 1 shows components of an environment in which one or more embodiments of the invention may be practiced.

FIG. 1 shows components of an environment in which one or more embodiments of the invention may be practiced. Not all the components may be required to practice the invention, and variations in the arrangement and type of the components may be made without departing from the spirit or scope of the invention. As shown, system 100 of FIG. 1 includes network 105, query processor (content server) 106, mobile device (client device) 102, client device 101, and data providers 130-131

Mobile device 102 may include virtually any portable computing device capable of receiving and sending a message over a network, such as network 105 or the like. Mobile device 102 may also be described generally as client devices that are configured to be portable. Thus, mobile device 102 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile device 102 typically ranges widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile device 102 also may include at least one other client application that is configured to receive content from another computing device. The client application may include a capability to provide and receive textual content, media content, and the like. The client application may further provide information that identifies itself, including a type, capability, name, and the like. In one embodiment, mobile device 102 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to query processor 106, client device 101, or other computing devices.

Mobile device 102 may be configured to receive content from query processor (content server) 106 over network 105. Mobile device 102 may further be configured to include a client application that enables the end-user to log into an end-user account that may be managed by another computing device, such as query processor 106. Such end-user account, for example, may be configured to enable the end-user to receive emails, send/receive IM messages, SMS messages, access selected web pages, or the like.

Client device 101 may include virtually any computing device capable of communicating over a network to send and receive information, or the like. The set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared content, and to annotate the content, add additional content, or the like. Similar to mobile device 102, client device 101 may be configured to receive content from query processor (content server) 106 over network 105.

Network 105 is configured to couple query processor 106 and its components with other computing devices, including, client device 101, and mobile device 102. Network 105 is enabled to employ any form of computer readable media for communicating information from one electronic device to another.

Network 105 may also include any of a variety of wireless sub-networks that may further overlay stand-alone ad-hoc networks, and the like, to provide an infrastructure-oriented connection for mobile device 102. Such sub-networks may include mesh networks, Wireless LAN (WLAN) networks, cellular networks, and the like.

Network 105 may further include an autonomous system of terminals, gateways, routers, and the like connected by wireless radio links, and the like. These connectors may be configured to move freely and randomly and organize themselves arbitrarily.

Network 105 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile device 102 with various degrees of mobility. For example, network 105 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, Network 105 may include virtually any wireless communication mechanism by which information may travel between mobile device 102 and another computing device, network, and the like.

Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between query processor 106, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

One embodiment of query processor 106 is described in more detail below in conjunction with FIG. 3. Briefly, however, query processor 106 may include any computing device capable of connecting to network 105 to process a database query and/or provide content over network 105. Query processor 106 may receive a request for content, and direct the request to a web application, or other application. The application may generate a plurality of database queries to be run against a data warehouse/database. In another embodiment, the database queries may be sent directly from client devices 101-102. In one embodiment, each of client devices 101-102 may send a different one of the plurality of database queries.

Database queries that run against a data warehouse tend to process very large amounts of data and are usually bound by the rate at which they scan the data. It is not uncommon for a query to spend a significant of its time reading and parsing the data from a data warehouse. Moreover, a user of the data warehouse may perform multiple queries against the same table or same portion (e.g., partition) of the same table. For example, the user may query one column of a table and then may query another column of the same table. Performance of a plurality of queries that share the same scanned data may be improved by running the plurality of queries together and sharing the scanning (e.g., reading and parsing) of the same data for the plurality of queries.

Therefore, in one embodiment, the plurality of database queries may be received by another process or component on query processor 106. The plurality of queries may be parsed into a plurality of trees, query-optimized, transformed, and combined into a master execution plan. The combined master execution plan may, for example, share the same reading and parsing operation(s), thus enhancing performance. The time to execute (latency of) the plurality of queries may be decreased. Moreover, resource load (e.g., hardware, network, CPU resource load) may be decreased on the system as a whole because of fewer execution parts/operations to be performed for all database queries.

The combined master execution plan may then be run against a data warehouse. For example, the master execution plan may be sent to data providers 130-131 for processing. Data providers 130-131 may execute a shared set of instructions. Data providers 130-131 may also execute each of the portions of the execution plan that are unique to each of the plurality of database queries, in sequence, in parallel, or the like. Data providers 130-131 may send to query processor 106, a plurality of results. In one embodiment, each of the plurality of results may be provided at once. In another embodiment, each of the plurality of results may be sent as soon as they are ready.

Figure 4:
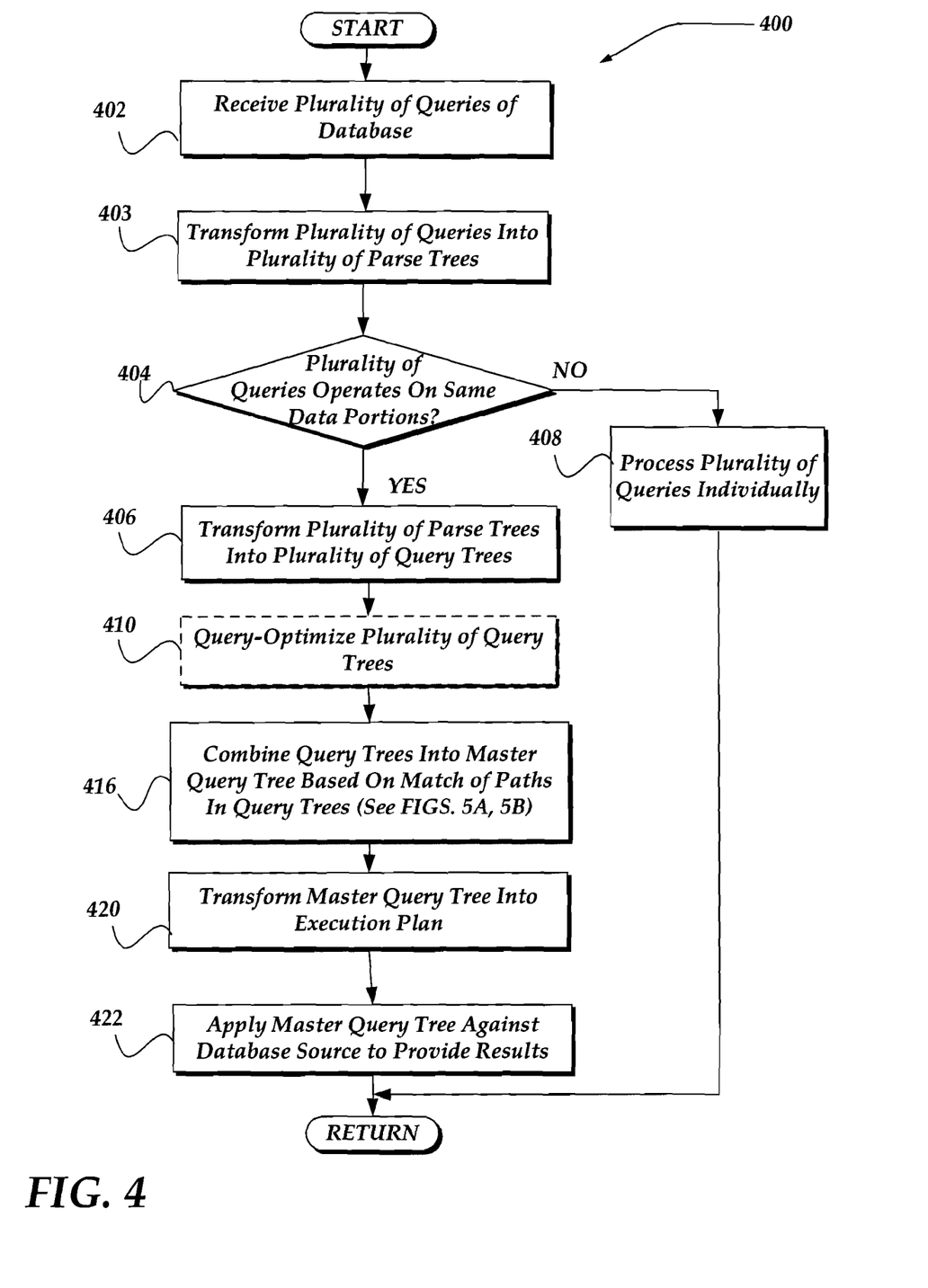
FIG. 4 illustrates a logical flow diagram generally showing one embodiment of a process for combining a plurality of database queries into a master execution plan.
Figure 5A:
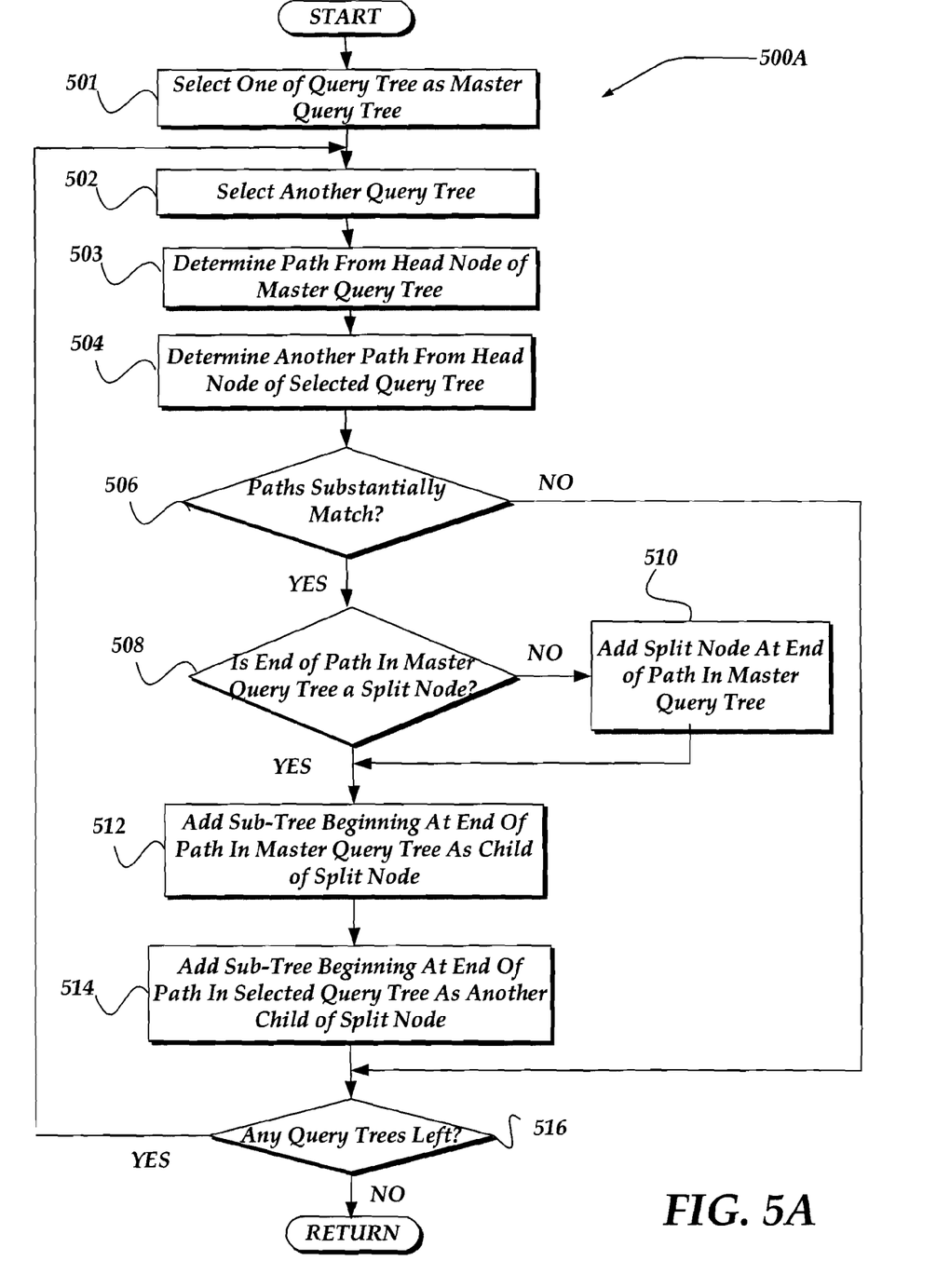
FIG. 5A illustrates a logical flow diagram generally showing one embodiment of a process for combining a plurality of database queries.
Figure 5B:
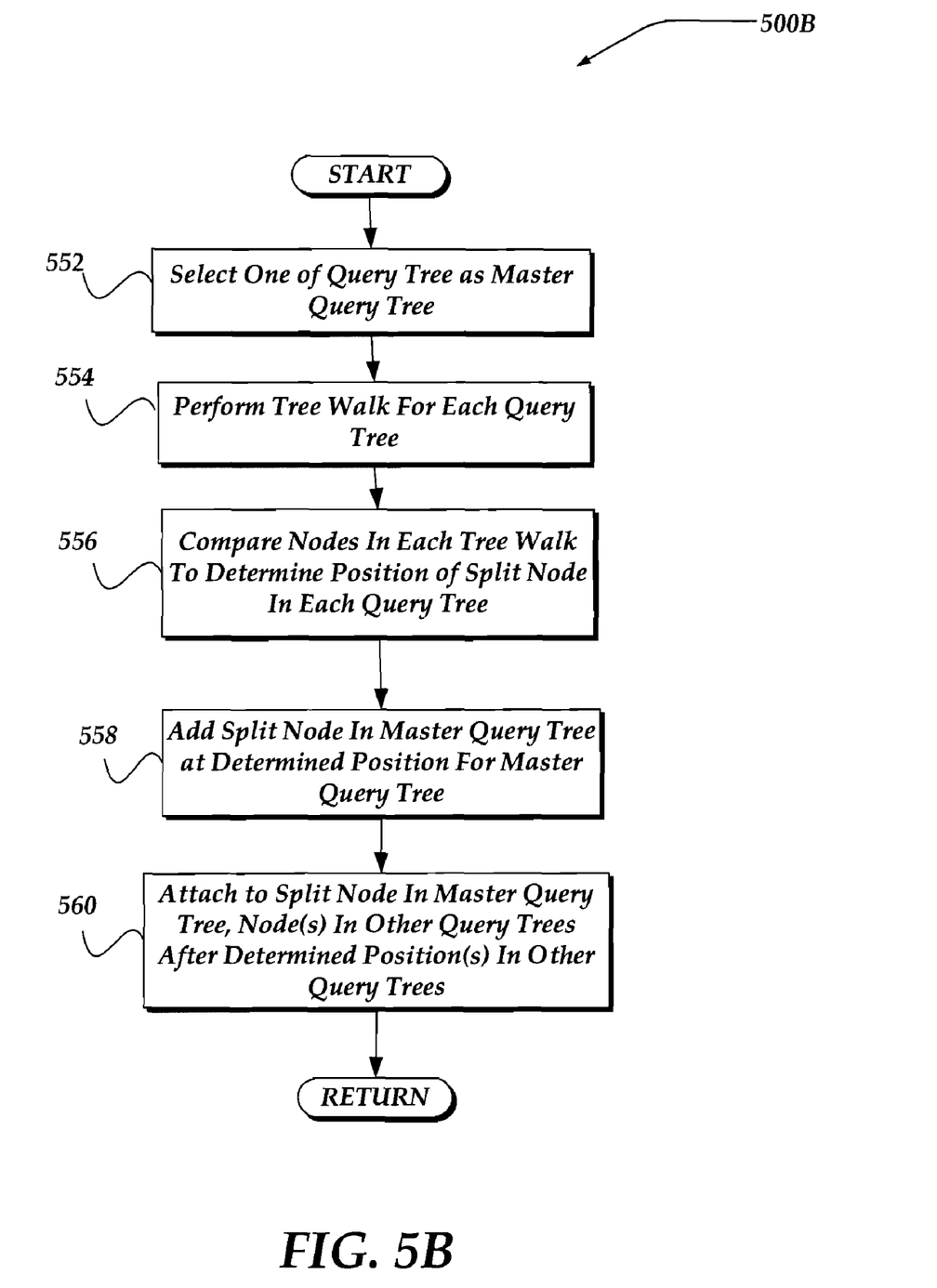
FIG. 5B illustrates a logical flow diagram generally showing an alternate embodiment of a process for combining a plurality of database queries.

Query processor 106 may format, manipulate or otherwise process the received results before providing the results as content over network 105. Query processor 106 may employ a process similar to that described below in conjunction with FIGS. 4, 5A, and/or 5B to perform at least some of its actions.

In another embodiment, where the database queries are sent directly from client devices 101-102, query processor 106 may reply to each of client devices 101-102 with a result associated with a database query sent by a particular one of the client devices 101-102.

As described above, data providers 130-131 are in communication to query processor 106. Data providers 130-131 may be coupled to query processor 106 over a network, a LAN, or the like. Data providers 130-131 may include any component configured for providing data from a database system, data warehouse or the like, including a relational database system, a hierarchical database system, an object oriented database system or the like. In one embodiment, data providers 130-131 may expose an abstract storage layer. The implementation of the abstract storage layer may be diverse, including storing data in a data warehouse, on multiple disks, memory types, database types, or the like. The abstract storage layer may also provide access to generated data, compressed data, or the like.

Data providers 130-131 may also be configured to receive at least a portion of an execution plan, which may include a plurality of execution parts. The execution plan/parts may be interpreted, compiled to p-code (pseudo code), or the like. The execution plan/parts may activate processes for reading, writing, filtering, or otherwise manipulating data stored in a variety of locations, including main memory, secondary memory, or the like. In any case, data providers 130-131 may provide results to query processor 106 for further processing.

Although FIG. 1 illustrates query processor 106 as a single computing device, the invention is not so limited. For example, one or more functions of query processor 106 may be distributed across one or more distinct computing devices. For example, processing content, parsing database queries, combining queries, generating a master execution plan, or the like, may be performed by a plurality of computing devices, without departing from the scope or spirit of the present invention. Moreover, data provider 130-131 may also reside within query processor 106.

Figure 2:
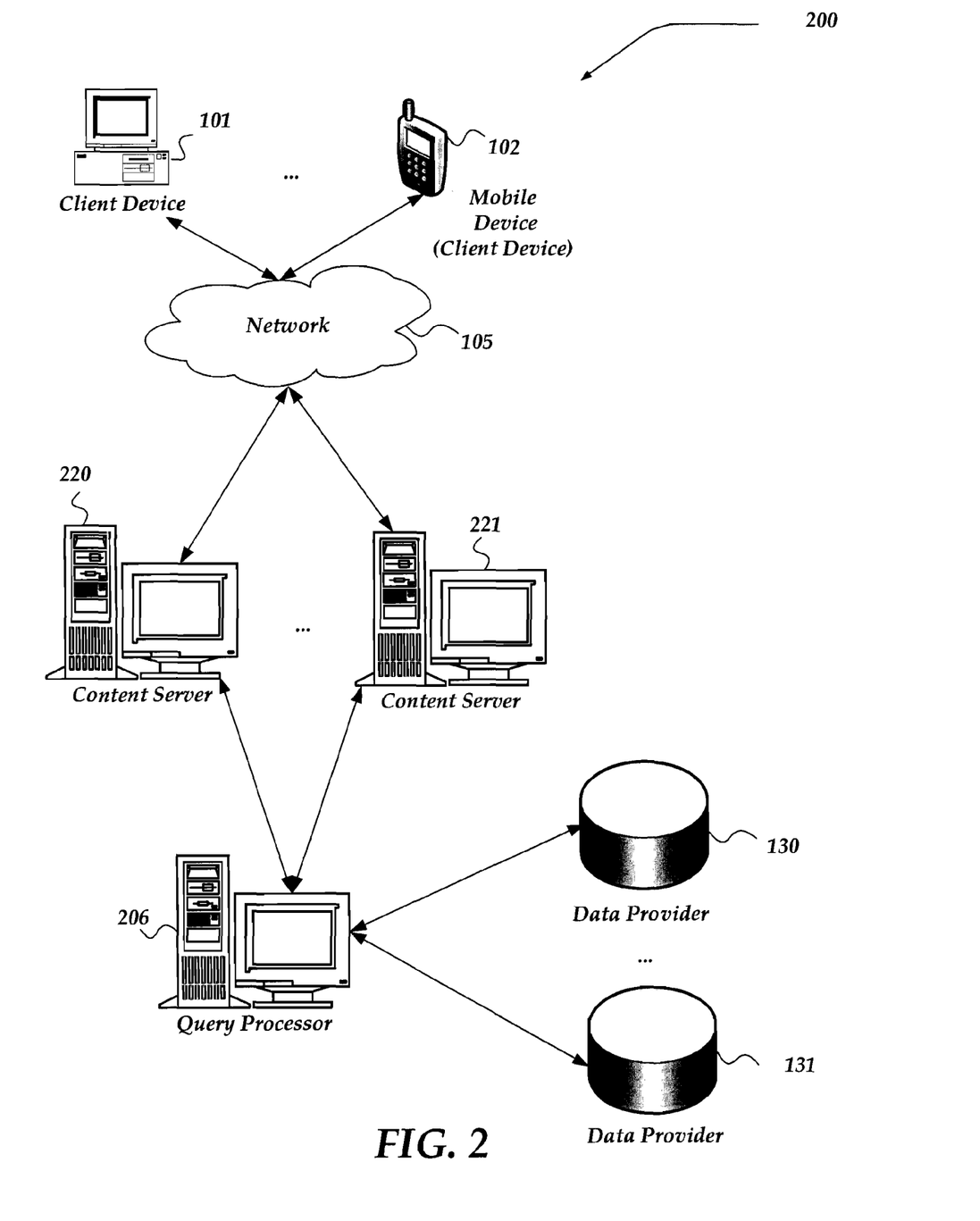
FIG. 2 shows components of an environment in which one or more alternate embodiments of the invention may be practiced.

FIG. 2 shows components of an environment in which one or more alternate embodiments of the invention may be practiced. FIG. 2 includes substantially the same components as FIG. 1. For example, system 200 of FIG. 2 includes network 105, mobile device (client device) 102, client device 101, and data providers 130-131. However, unlike system 100, system 200 includes query processor 206, and content servers 220-221. In this embodiment, content servers 220-221 are coupled to query processor 206 and also coupled to network 105. Content servers 220-221 may receive a request for content. Content servers 220-221 may send a plurality of database queries to query processor 206 for further processing. As shown, query processor 206 acts as a middle layer to enable, for example, a thin-client connection from content servers 220-221 to data providers 130-131. Query processor 206 may operate on the queries in substantially the same way as query processor 106, except that query processor 206 replies with the results over a connection (e.g., a network connection) to content servers 220-221. In one embodiment, the connection may include a variety of mechanisms, protocols, or the like, including a command line interface, Open Database Connectivity (ODBC), XML, XmlHTTPRequest (XHR), a proprietary protocol, or the like. One embodiment of query processor 206 is described in more detail below in conjunction with FIG. 3. Moreover, query processor 206 may employ a process similar to that described below in conjunction with FIGS. 4, 5A, and/or 5B to perform at least some of its actions.

Illustrative Server Environment

Figure 3:
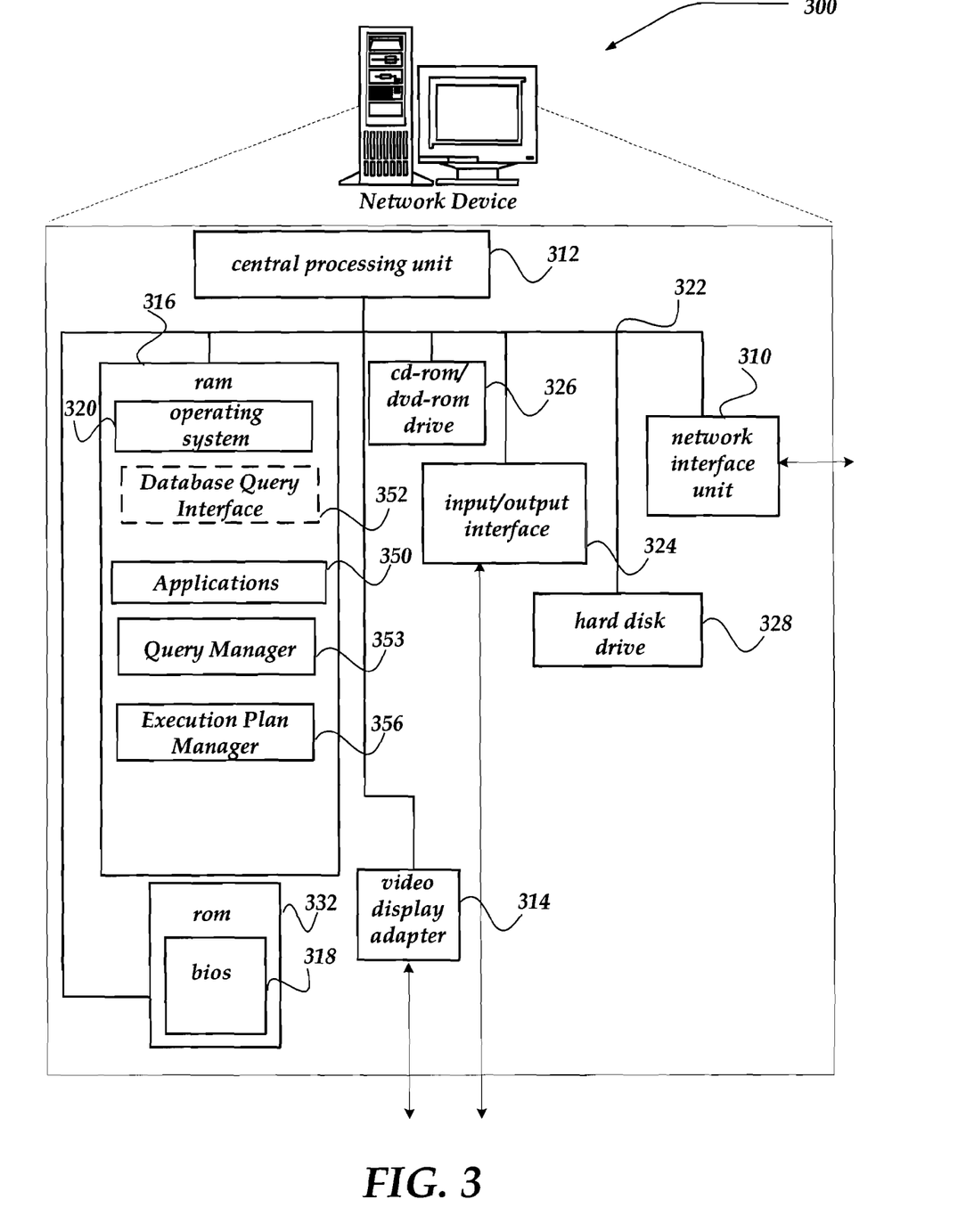
FIG. 3 shows one embodiment of a network device, according to one embodiment of the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, query processor 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. In one embodiment, the operating system may be FreeBSD, or another UNTIX operating system. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, including XmlHTTPRequest (XHR), Asynchronous JavaScript and XML (AJAX), JavaScript Object Notation (JSON) programs, customizable user interface programs, IPSec applications, encryption programs, security programs, account management, and so forth.

Database query interface 352 may also be included in network device 300. As shown, Database query interface 352 may be optional (as indicated by the dotted box), and in some embodiments, may not be included. In other embodiments, database query interface 352 may be configured to receive a plurality of database queries over, for example, network interface 310. In one embodiment, database query interface 352 may be a command line interface. The plurality of database queries may be received over any of a variety of protocols, including ODBC, XML-RPC, HTTP, or the like. Database query interface 352 then sends the plurality of database queries to query manager 353 for further processing. In another embodiment, database query interface 352 may be a command line interface. In yet another embodiment, database query interface 352 may be an Application Programming Interface (API) to query manager 353.

Figure 6:
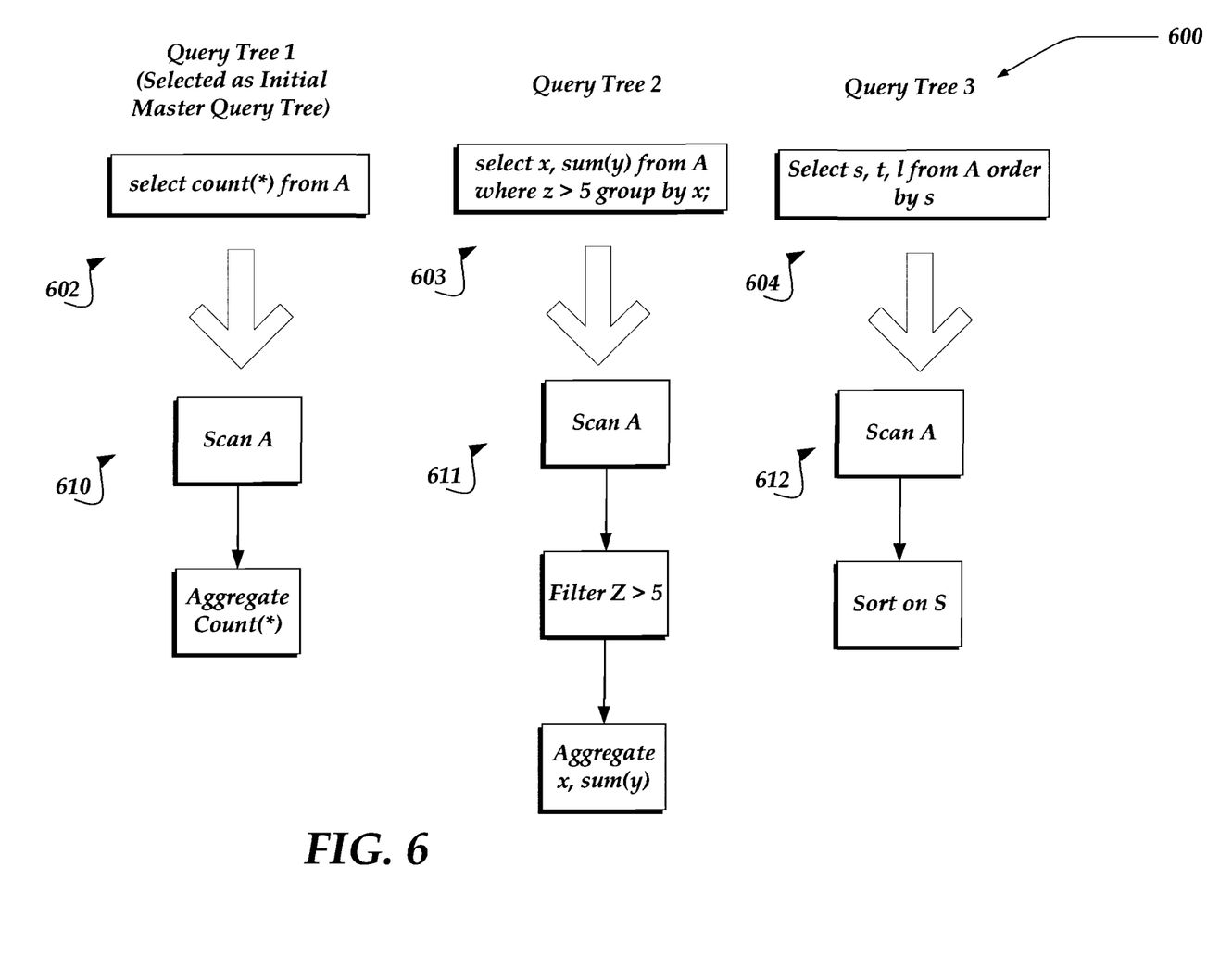
FIGS. 6-8 show use cases of combining query trees into a master query tree.
Figure 7:
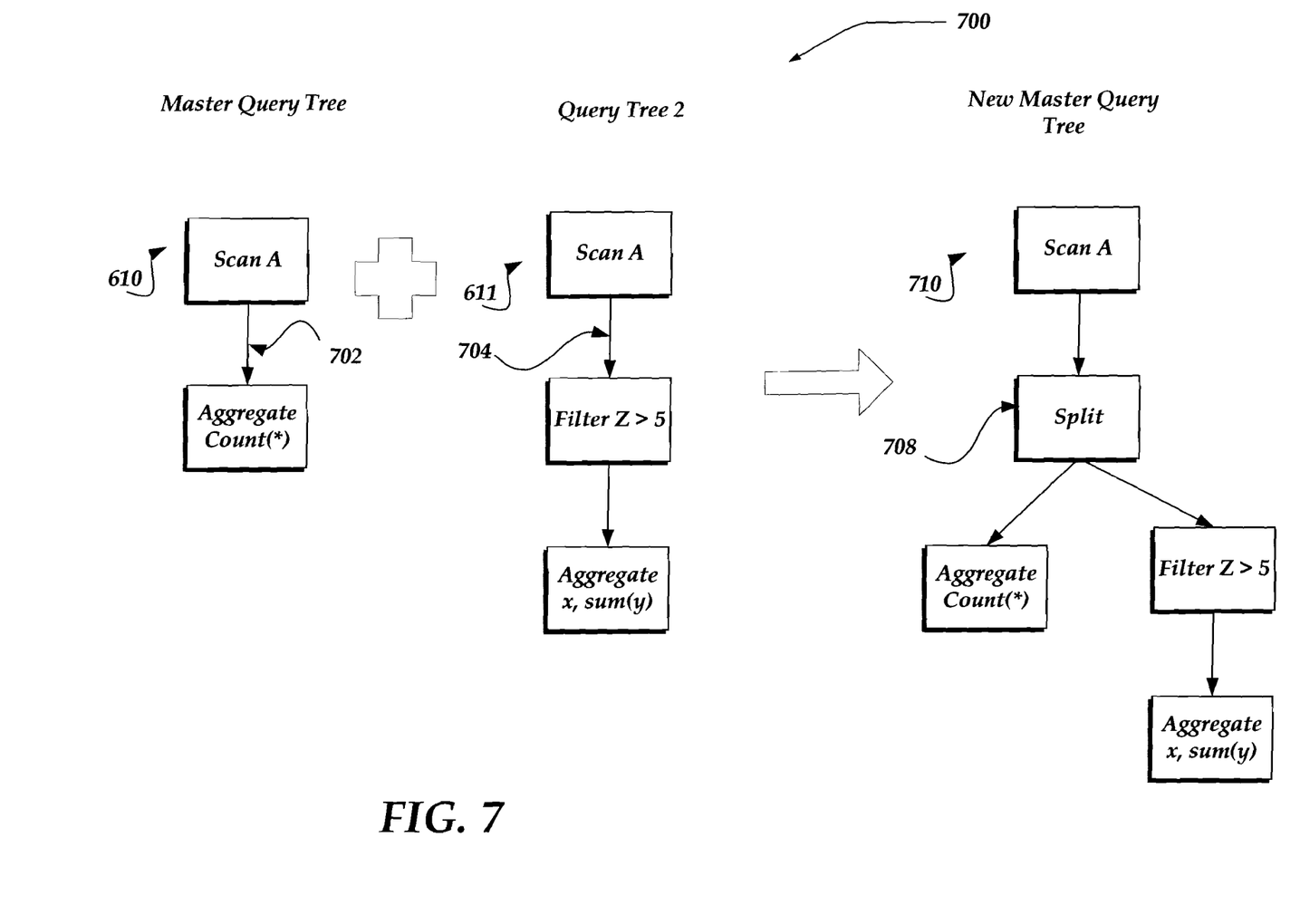

Query manager 353 includes any component configured to receive database queries, parse the database queries into a plurality of tree representations of the queries, transform, query-optimize, and/or combine the tree representations, or the like. Referring briefly to FIG. 6, query manager 353 may receive queries 602-604. Queries 602-604 may be stored in RAM 316, as, for example, a text representation. In one embodiment, query manager 353 may apply parsing rules based on a grammar of the query language of the plurality of queries (e.g., SQL, OQL). Each of the queries may be parsed into a parse tree representation (e.g., a tree data structure of the database queries). The parse tree representation may then be transformed into a relational algebra expression, including a set of operators applied to variables, tables, portions of tables, or the like. In one embodiment, the relational algebra expression may be stored in RAM 316 as a query tree structure. Optionally, the query tree structure may be query-optimized. The query tree structure may be transformed into an execution plan. The execution plan may also be represented as a tree structure in RAM 316, wherein the nodes of the tree may include execution parts. Execution parts may include implementation specific instructions, including a "Scan" operator to read/parse a data source (e.g. at least a portion of a table), an "Aggregate" operator to combine a plurality of values, a "Filter" operator to select a subset of values from a larger set of values, a "Sort" operator to order a plurality of results, or the like. For example, referring briefly to FIG. 6, query manager 353 may transform each of queries 602-604 into execution plan query trees 610-612, respectively. Query manager 353 may also combine a plurality of query trees into a single master query tree. Referring briefly to FIG. 7, query manager 353 may combine query tree 610 with query tree 611, to generate master query tree 710, such that master query tree 710 includes at least one path that is included in both query trees 610-611, as well as the different portions of each of query trees 610-611. Query manager 353 may employ a process similar to that described below in conjunction with FIGS. 4, 5A, and/or 5B to perform at least some of its actions.

Execution plan manager 356 includes any component for receiving an execution plan, sending the execution plan over network 310 for further processing and/or applying the execution plan to a data source. In one embodiment, execution plan manager 356 may receive a combined execution plan from query manager 353 and may send the combined execution plan over network interface 310 to a data provider, such as one of data providers 130-131 of FIG. 1. Execution plan manager 356 may receive results over network interface 310, and may provide the results via an API, via database query interface 352, or the like.

Generalized Operation

Figure 8:
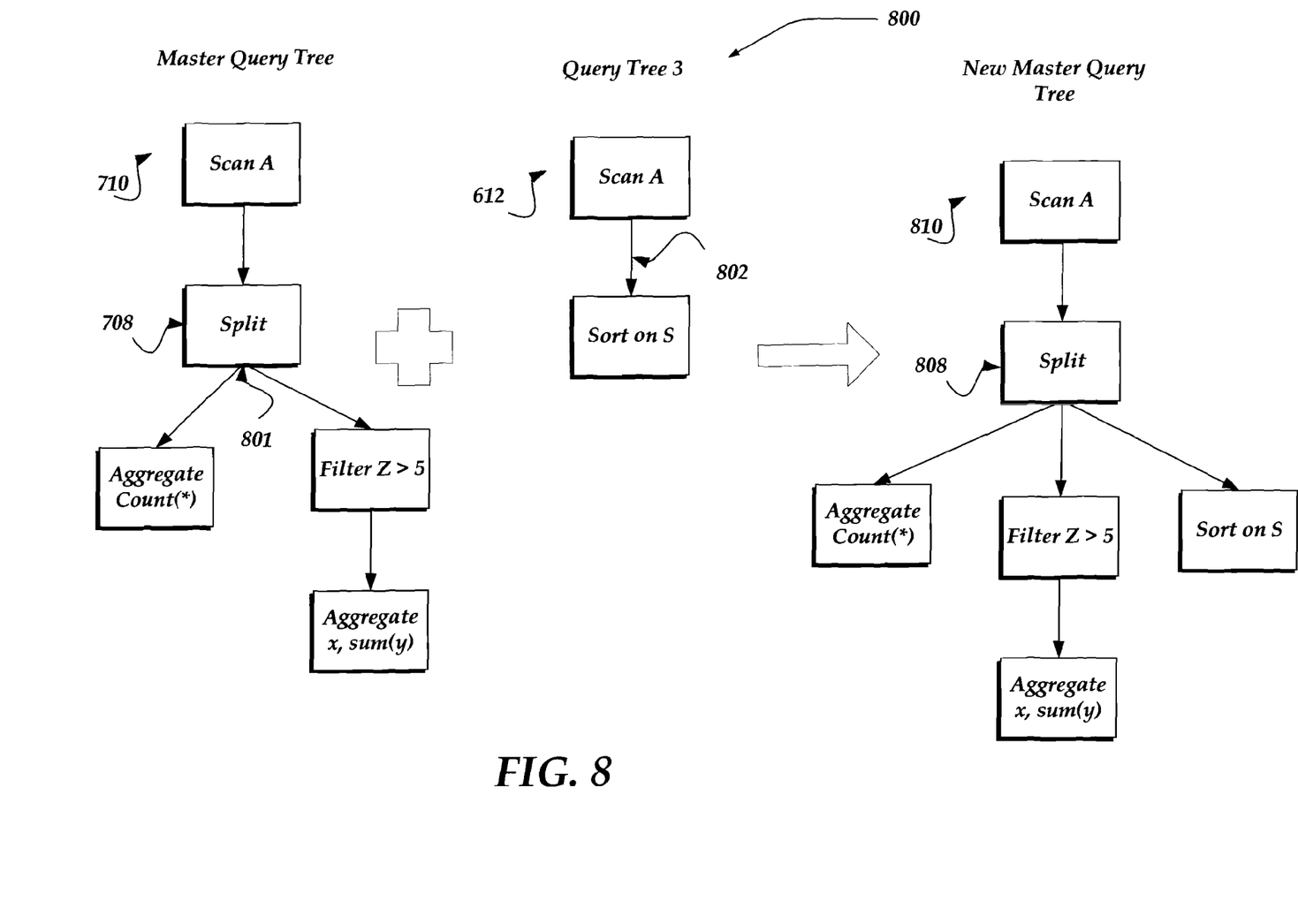

The operation of certain aspects of the invention will now be described with respect to FIGS. 4, 5A, and 5B. FIGS. 4, 5A, and 5B provide logical flow diagrams of certain aspects, while FIGS. 6-8 provide use cases of combining query trees into a master query tree.

FIG. 4 illustrates a logical flow diagram generally showing one embodiment of a process for combining a plurality of database queries into a master execution plan. Process 400 may be performed by query processor (content server) 106 of FIG. 1 and/or query processor 206 of FIG. 2.

Process 400 begins, after a start block, at block 402, where a plurality of queries of a database is received. In one embodiment, the database is a relational database. In one embodiment, at least one of the plurality of queries is an Structured Query Language (SQL) statement. The SQL statement may include a SELECT statement and/or an INSERT statement. In one embodiment, the INSERT statement may define an insertion from a source portion (e.g., partition) of a table into destination portion of a table. For example, the INSERT statement may define an insertion from a result of a SELECT statement. In one embodiment, the plurality of queries may be received over a network, for example, over an XML-RPC interface, over a thin-client interface, over an ODBC connection, or the like. Referring briefly to FIG. 6, the plurality of queries may be queries 602-604. Processing then continues to block 403.

At block 403, each of the received plurality of queries may be parsed into a parse tree. In one embodiment, the transformation may be based on a parser, on a context-free grammar of the database query language, or the like. In one embodiment, the plurality of queries may be parsed into a parse tree (e.g., an internal representation of a database query statement). The parse tree may then be transformed into another parse tree that represents a relational algebra expression. One skilled in the art will appreciate that this transformation may be based on lookup rules, algorithms, heuristics, or the like, as is typically performed in a database system. In any case, processing then continues to decision block 404.

At decision block 404, it is determined whether the plurality of queries operates on at least the same portion/partition of the same data (e.g., at least one partition of one table in common). In one embodiment, the operation of block 404 may determine if the plurality of query trees are combinable.

In one embodiment, the parse tree may be read to determine whether the associated query operates on the same portion of the same data, based on for example, comparing clauses included in the queries and/or the portions/partitions of data on which the queries operates. In one embodiment, this determination is based on the WHERE clause and/or the FROM clause of at least one of the plurality of queries. In one embodiment, the pluralities of queries are determined to have identical FROM clauses (e.g., all FROM clauses to generate the same JOIN or MERGE execution parts). In one embodiment, all the FROM clauses may be determined to operate on the same data portions/partitions.

Referring to FIG. 6, it is determined that queries 602-604 operates on the same table "A" based on the queries' FROM clauses. In one embodiment, the WHERE clause may also be determined to be the same (e.g., operate on the same tables). In one embodiment, if a selection is made on a portion of a table (e.g., via a VIEW, a partitioned table, or the like), it is determined whether the plurality of queries operates on the same portion of the same data and/or table. For example, a view may be determined to span rows with primary keys between 0-100 of table "A". It is then determined whether the queries operate on the same rows in table "A" associated with primary keys 0-100.

In another embodiment, where at least one of the plurality of queries is an INSERT statement, it is determined whether the source portion of a table/data is the same as the source portion of the other plurality of queries. In any case, if it is determined that the plurality of queries operates on at least the same portion of the same table/data, processing continues to block 406. Otherwise, processing continues to block 408.

In an alternate embodiment, decision block 404 may occur before block 403. In this embodiment, at decision block 404, the textual representation of the plurality of queries may be read and used to determine if the plurality of queries operates on the same portion of the same table. If it is determined that the plurality of queries does not operate on at least the same portion of the same table, processing continues to block 408. If it is determined that the plurality of queries operates on at least the same portion of the same table, processing continues to block 403, and then to block 406.

In another alternate embodiment, at decision block 408, the plurality of queries and/or plurality of parse trees may first be filtered for queries that operate on the same table or the same portion of the same table. It may then be determined if there are any filtered plurality of queries/parse trees. If there are, then processing continues to block 406. Otherwise, processing continues to block 408.

At block 408, each of the plurality of queries may be individually processed, as conventionally performed in a database system. For example, a query may be parsed into a parse tree. The parse tree may be transformed into a query tree. The query tree may be query-optimized. The query-optimized tree may be transformed into an execution plan, and the execution plan may be executed to provide results/datasets. Processing then returns to a calling process for further processing.

At block 406, the plurality of parse trees is transformed into a plurality of query trees. In one embodiment, each of the query trees may represent an execution plan for each of the associated plurality of queries. Referring to FIG. 6, query 602 is transformed into query tree 610, query 603 is transformed into query tree 611, and query 604 is transformed into query tree 612. Processing then continues to block 410.

In one embodiment, at block 410, at least one of the plurality of query trees are individually query-optimized. As shown, block 410 is optional and may not be performed. One skilled in the art will appreciate that there may be many mechanisms for query-optimizations, including simulation, rule-based matching, pattern matching, using dynamic programming, using statistics, or the like.

In one embodiment, each of the plurality of query trees may be transformed into a canonical form of the query tree. For example, a node in the query tree of the form "JOIN A and B" may be transformed simply into the node "JOIN." In one embodiment, the canonicalized query tree may be matched against a plurality of pattern trees to determine a matched tree pattern. At least one tree transformation is applied to the query tree associated with the matched canonicalized query tree based on a heuristic associated with the matched tree pattern. In one embodiment, the transformations include at least one of reordering the query tree, changing a type of a node of the query tree, removing a node from the query tree, collapsing a plurality of nodes of the query tree into a single node, or the like. In one embodiment, the application of the transformation generates an query-optimized query tree.

In any case, the canonical query trees are query-optimized. In one embodiment, each canonical/optimized query tree may be associated with a score that may represent how efficient the query-optimized query tree is determined to be. For example, the score may be an inverse of the costs (e.g., CPU, network, or disk access costs) for executing the query tree. Processing then continues to block 416.

At block 416, the plurality of query trees are combined into a master query tree based in part on a match of paths in the plurality of query trees. The operation of block 416 is described in more detail in conjunction with process 500A of FIG. 5A and/or 500B of FIG. 5B. Briefly, however, in one embodiment, one of the query trees is selected as the master query tree. At least another one of the query trees is combined into the master query tree. A tree walk may be performed on the master query tree and the other query tree(s). Based on a match of the nodes visited by the tree walk (e.g., a match of the nodes in a path within the query trees), a position for a split node is determined. A portion of the selected query tree(s) may be attached to the split node in the master query tree.

Referring briefly to FIG. 7, selected query tree 611 is combined into master query tree 610. A path from the head node of query tree 610 to position 702 is determined. Another path from the head node of query tree 611 to position 704 is determined. Based on the paths, a split node 708 is inserted/added into the master query tree, and the children of split node 708 are determined as the sub-tree after position 702 and the sub-tree after position 704, respectively. Referring back to FIG. 4, processing then continues to decision block 420.

At block 420, the master query tree is transformed into an execution plan. One skilled in the art will appreciate that this transformation may be based on lookup rules, algorithms, heuristics, or the like, as is typically performed in a database system. The execution plan may be based, among other things on keys defined for tables operated on by the plurality of queries, or the like. In one embodiment, the query tree may be the final execution plan, in which case block 420 may be optional.

In another embodiment, the nodes of the query tree may be mapped to specific instructions/operations particular to a database implementation. Each execution part of the execution plan may be associated with at least one node in the query tree. The execution parts of the execution plan may be specific to an implementation of the database system. In one embodiment, the execution plan may be represented as a tree, a graph, a list, an expression, or the like. Processing then continues to block 422.

At block 422, the execution plan is applied to the database. In one embodiment, the execution plan is applied to the at least one portion of at least one table operated on by the plurality of queries received at block 402. In one embodiment, the execution plan may be provided (e.g., sent) to a database engine/data provider for execution. For example, in one embodiment, at least one of data providers 130-131 of FIG. 1 may receive the execution plan.

In one embodiment, the query execution order particular to each of the different execution parts that are not common to the plurality of queries may be performed sequentially. For example, in one embodiment, blocks 402, 403, 404, 406, 410, 416, and 420 may be applied to all the plurality of queries as described above (e.g., a parse and optimize stage are performed to all the plurality of queries). Subsequently, at block 422, a first stage execution is performed on the common execution parts (e.g., the execution parts before a split node). Then, a second stage execution is performed in sequence, on each of the remainder of the execution parts particular to each of the plurality of queries.

In one embodiment, query execution of execution parts against a table, data, and/or a data partition (e.g., portion) may be parallelized. In one embodiment, the execution may be parallelized if every node/execution parts of the execution plan execute the same operation or code applied to a different part of the data and/or data partition.

However, the execution may be parallelized in other ways, without departing from the scope of the invention. For example, referring to FIGS. 6-8, the "Scan" operations are determined to be performed for a plurality of queries. Accordingly, a single "Scan" operation may instead be specified to be performed in the combined execution plan. The single scan then is performed by the database engine/data provider on the at least one portion of the at least one table. Intermediate results of the scan may be stored in memory (e.g., cached). A split operator may also be performed, for example, to queue a plurality of sequences of operations, schedule the parallel execution of the plurality of sequences of operations, or the like. In one embodiment, the other execution parts after a split node may then be performed on the intermediate results to provide a plurality of (final) results. The database engine/data provider may provide at least one result, dataset, or the like, based on the combined execution plan.

In one embodiment, each of the plurality of results may be associated to at most one of the plurality of received queries from block 402. In one embodiment, a result of an operation defined by a leaf node of the master execution plan may be associated with at most one of the plurality of received queries. Processing then returns to a calling process for further processing.

In an alternate embodiment, each of the plurality of query trees at block 406 may not represent a different execution plan. Instead, each of the plurality of the query trees at block 406 may represent a relational algebra expression. In this embodiment, blocks of process 400 operate similarly as described above on this type of plurality of query trees.

FIG. 5A illustrates a logical flow diagram generally showing one embodiment of a process for combining a plurality of queries. Process 500A may also be performed by query processor (content server) 106 of FIG. 1 and/or query processor 206 of FIG. 2.

Process 500 begins, after a start block, at block 501, where one of the query trees of the plurality of query trees is selected as a master query tree. Referring to FIG. 6, query tree 610 is selected as the master query tree. In one embodiment, the query tree selected may be the query tree determined to be the least optimized (e.g., having the lowest query-optimized score). The query-optimized score for the query tree may be determined, for example, at block 410 of FIG. 4. In another embodiment, the query tree may be selected at random, as the first query tree in the plurality or query trees, or the like. The selected query tree is removed from the plurality of query trees. In an alternate embodiment, the master query tree may be an empty tree (e.g., a tree with no nodes). Processing then continues to block 502.

At block 502, another query tree is selected. The other query tree may be selected at random, as the next query tree in the plurality of query trees, or the like. The selected query tree may be removed from the plurality of query trees. Processing then continues to block 503.

At block 503, a path from the head node of a master query tree is determined. The path may be determined by a variety of tree walking algorithms, including a depth-first search, a breadth-first search, an A* search, or the like. Processing then continues to block 504.

At block 504, another path from the head node of a selected query tree is determined. The other path may be determined in a substantially similar fashion as in block 502. Referring briefly to FIG. 7, a path from the head node of query tree 610 to position 702 is determined. Another path from the head node of query tree 611 to position 704 is determined. Processing then continues to decision block 506.

At decision block 506 it is determined whether the paths substantially match each other. In one embodiment, the path and the other path may match each other if all the nodes in the two paths are the same and/or are of a particular type. In one embodiment, certain types of nodes, such as, Scan, Merge, Join, Filter, or Explode, or the like, are determined to match (e.g. be combinable). For example, the path "Scan→Merge→Join" may match the other path "Scan-Merge→Join."

In another embodiment, the two paths may be a substantial match if all the nodes, except a split node(s) in the path associated with the master query tree, matches. Thus, a substantial match may ignore a split node(s) in the paths. Referring briefly to FIG. 7, it is determined that the path to position 702 and the other path to position 704 substantially matches each other. Also, referring briefly to FIG. 8, it is determined that the path to position 801 substantially matches the path to position 802. As shown, the master query tree 710 of FIG. 8 was generated from, for example, a previous invocation process 500. Thus, the master query tree 710 includes a split node 708. In this example, match of the path to position 801 and the path to position 802 ignores the split node 708. Referring back to process 500, if it is determined that the paths substantially match, processing then continues to decision block 508. Otherwise, processing returns to a calling process for further processing.

At decision block 508, it is determined whether the end of the path of the master query tree is a split node. If the end of the path is a split node, then processing continues to block 512. If the end of the path is not a split node, then processing continues to block 510, where a split node is added at a position after the end of the path in the master query tree. Referring briefly to FIG. 7, based on the paths, a split node 708 is inserted/added into the master query tree after the "Scan A" node. Processing then continues to block 512.

At block 512, a sub-tree of the master query tree beginning at the end of the path is added as a child of the split node. In one embodiment, this sub-tree is added as the child if the sub-tree is not already a child of the split node. Referring to FIG. 7, the sub-tree after position 702 is added as a child of split node 708. Processing then continues to block 514.

At block 514, another sub-tree of the selected query tree beginning at the end of the other path is added as another child of the split node. Referring to FIG. 7, the sub-tree after position 704 is added as a child of split node 708. Processing next continues to decision block 516.

At decision block 516, it is determined whether there exists any query trees left in the plurality of query trees. If there exists any query trees left, then processing loops back to block 502. Otherwise, processing returns to a calling process for further processing.

In another embodiment, the tree walk of block 502 and block 504 may be performed in parallel. In this embodiment, the selected query tree and the master query tree may be walked together (e.g., using a depth first search algorithm), such that a node in the tree walk of one tree matches another node in the tree walk of the other tree. The two paths are found when it is determined that the nodes no longer matches, are not the same, or the like. In any case, the path for the master query tree and the other path for the selected query tree are determined.

Moreover, while process 500 shows blocks of process 500 applied to each query tree in sequential fashion, process 500 may be modified to operate in a parallel tree walk without departing from the scope of the invention. For example, a different path for each of the query trees may be determined. It may then be determined whether each of the paths substantially matches each other. A master query tree may be created with the matched path as a first part of the tree, a split node as a child at the end of the matched path, and different sub-trees of the query trees as children of the split node. Other tree matching and/or tree walking algorithms may also be applied to perform a parallel implementation of process 500 without departing from the scope of the invention. FIG. 5B illustrates a logical flow diagram generally showing an alternate embodiment of a process for combining a plurality of queries using, for example, a parallel tree walking algorithm. Process 500B may be performed by query processor (content server) 106 of FIG. 1 and/or query processor 206 of FIG. 2.

Process 500 begins, after a start block, at block 552, where one of the query trees of the plurality of query trees is selected as a master query tree. In one embodiment, the query tree may be selected at random, may be selected based on whether the query tree is the least optimized, or the like. In one embodiment, block 552 may operate substantially similarly to block 501 of process 500A. Processing then continues to block 554.

At block 554, each of the query trees is tree walked, using any tree walking algorithm. The tree walk may be performed in node dependency order (e.g., from a parent node to a child node). In one embodiment, each of the head-node of each query tree is walked, then each of the next node of each query tree is walked, and so forth. Processing next continues to block 556.

At block 556, the nodes visited in each of the tree walks are compared to each other to determine where the split node should be inserted. In one embodiment, blocks 554 and 556 may be performed concurrently. At each node visited in the tree walk, the nodes may be compared based on, for example, the types of the nodes. In one embodiment, certain types of nodes are determined to be matched/combinable (e.g., Scan, Merge, Join, Filter, or Explode). If the nodes in each of the query trees match based on the types, then the tree walk continues. If the nodes do not match then, for each query tree, a position of a split node is determined at the position before each of the respective nodes in each of the query trees. Blocks 554 and 556 may operate substantially similarly to blocks 503 and 504 of process 500A. Processing then continues to block 558.

At block 558, a split node is added into the master query tree at the determined position for the master query tree. Block 558 may operate substantially similarly to block 510 of process 500A. Processing then continues to block 560.

At block 560, the nodes of the sub-trees after the determined position in each of the query trees are attached/added as children of the split node in the master query tree. Block 560 may operate substantially similarly to blocks 512 and 514 of process 500A. Processing then returns to calling process for further processing.

FIGS. 6-8 show use cases of combining query trees into a master query tree, as described above in conjunction with FIGS. 4, 5A and/or 5B. Briefly, processing begins at use case 600, where a plurality of queries 602-604 are received and parsed into a plurality of query trees 610-612. Although the nodes of the plurality of query trees 610-612 are shown as execution parts of an execution plan, the nodes may instead correspond to a plurality of relational algebra expression, without departing from the scope of the invention. Processing continues to use case 700, where two query trees 610-611 are combined into a master query tree 710, wherein a common path in query trees 610-611 forms a path in the master query tree, and wherein the different portions of query trees 610-611 are included as children of a split node in the master query tree 710. The process of combining continues in use case 800, until no other query trees are left. A final master query tree 810 is then generated and ready for applying against a database.

Although the examples query trees shown in FIGS. 6-8 have at most one head node, the trees may have multiple head nodes without departing from the scope of the invention. For example, a tree may begin with two "Scan" head nodes, which may be connected to a single "Join" node. Process 400 and 500 described above operates on such trees appropriately to generate a master execution plan.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for processing data, comprising:
   receiving to computer memory a plurality of queries to a database;
   employing at least one query processor to process the received queries, the processing actions of the query processor including:
      transforming the plurality of queries into a plurality of query trees;
      selecting one of the plurality of query trees as a master query tree;
      combining each of the plurality of query trees into the master query tree, wherein a portion of the master query tree and a portion of the each of the plurality of query trees are determined as children of a split node in the master query tree, and wherein the split node is added as a new node based in part on a match of a path in the master query tree and another path in the at least one of the plurality of query trees and the split node is unfound previously in any of the plurality of query trees including the master query tree; and
      applying the master query tree to at least one portion of one table from the database to provide a plurality of results, wherein each of the plurality of results is associated with one of the plurality of received queries.

2. The method of claim 1, wherein combining the each of the plurality of query trees into the master query tree further comprises:
   determining a position to add the split node in the master query tree, wherein the position is determined at an end of the path from a head-node of the master query tree, and
   wherein the path at least partially matches the other path from another head-node of at least one of the plurality of query trees;
   adding a sub-tree of the master query tree beginning at the end of the path, as a child of the split node; and
   adding another sub-tree of the each of the plurality of query trees beginning at the end of the other path, as another child of the split node.

3. The method of claim 1, wherein each of the plurality of queries operates on the same portion of a same table in the database.

4. The method of claim 1, wherein at least one of the plurality of queries is a Structured Query Language (SQL) statement.

5. The method of claim 1, further comprising query-optimizing the plurality of query trees based on pattern matching a canonical version of at least one of the plurality of query trees before combining.

6. The method of claim 1, wherein combining each of the plurality of query trees into the master query tree further comprises walking the master tree and at least one of the plurality of query trees until a node in a tree walk of the master tree is different from a node in a tree walk of at least one of the plurality of query trees.

7. The method of claim 1, wherein the match ignores split nodes in the path.

8. A system for processing data over a network, comprising:
 a relational database; and
 a query processor performing actions comprising:
  determining a plurality of queries to the relational database, wherein each of the plurality of queries operates on a same portion of a same table;
  transforming a selected query of the plurality of queries into a query tree;
  inserting a split node into a master query tree based in part on a match of a path in the master query tree and another path in the query tree, the split node being a new node unfound previously in any of the plurality of query trees including the master query tree;
  generating a master execution plan based on the master query tree; and
  employing the master execution plan to query the relational database to obtain a plurality of results, wherein each of the plurality of results is associated with one of the determined plurality of queries.

9. The system of claim 8, wherein the query processor further performs actions comprising:
 optimizing the query tree before determining the split node.

10. The system of claim 8, wherein inserting the split node is based on a match of a common path between the query tree and the master query tree.

11. The system of claim 8, further comprising:
 a mobile device performing actions comprising:
  sending at least one of the plurality of queries to the query processor; and
  receiving the at least one result associated with the at least one of the plurality of queries.

12. The system of claim 8, further comprising an abstract storage layer in communication with the at least one data provider, wherein the abstract storage layer provides access to the table in the relational database.

13. The system of claim 8, wherein the plurality of queries includes at least one of a SELECT statement or an INSERT statement.

14. The system of claim 8, wherein a path from a head-node of the master query tree to the split node includes at least one operation to scan the same portion of the same table.

15. A network device for processing data over a network, comprising:
 a transceiver for sending or receiving data;
 a database query interface in communication with the transceiver, wherein the database query interface sends and receives relational database queries;
 a processor that performs actions comprising:
  receiving a plurality of queries of a database;
  transforming each of the plurality of queries into a plurality of query trees;
  selecting at least one of the plurality of query trees as a master query tree;
  combining another one of the plurality of query trees into the master query tree, wherein a portion of the master query tree and a portion of the other one of the plurality of query trees are determined as children of a split node in the master query tree, and wherein the split node is added as a new node based in part on a match of a path in the master query tree and another path in the other one of the of the plurality of query trees and the split node is unfound previously in any of the plurality of query trees including the master query tree; and
  applying the master query tree to at least one portion of one table from the database to provide a plurality of results, wherein each of the plurality of results is associated with one of the received plurality of queries.

16. The network device of claim 15, wherein at least one of the plurality of queries is a Structured Query Language (SQL) statement.

17. The network device of claim 15, wherein determining the plurality of queries further comprises:
 determining whether each of the plurality of queries operates on a same portion of a same table based on either the WHERE clause or the FROM clause of at least one of the plurality of queries.

18. The network device of claim 15, wherein database query interface is at least one of an XmlHTTPRequest (XHR), interface, an Open Database Connectivity (ODBC) interface, or a command line interface.

19. A computer readable storage medium having processor executable instructions for providing data over a network, the processor executable instructions configured to enable a processor to perform actions, comprising:
 determining a plurality of queries of a relational database, wherein each of the plurality of queries operates on a same portion of a same table;
 transforming the plurality of queries into a plurality of parse trees;
 optimizing the plurality of parse trees into an plurality of query trees;
 determining a master query tree based on a combination of each of the plurality of query trees, wherein a portion of the master query tree and a portion of the each of the plurality of query trees are determined as children of a split node in the master query tree, and wherein the split node is added as a new node based in part on a match of a path in the master query tree and another path in the each of the of the plurality of query trees and the split node is unfound previously in any of the plurality of query trees including the master query tree; and
 performing a query on the relational database with the master query tree to provide a plurality of results, wherein each of the plurality of results is associated with one of the determined plurality of queries.

20. The computer readable storage medium of claim 19, wherein determining the master query tree is based on a depth-first search tree walk of each of the plurality of query trees.

* * * * *

UNITED STATES PATENT AND TRADEMARK OFFICE
CERTIFICATE OF CORRECTION

| | | |
|---|---|---|
| PATENT NO. | : 7,844,608 B2 | Page 1 of 1 |
| APPLICATION NO. | : 11/615899 | |
| DATED | : November 30, 2010 | |
| INVENTOR(S) | : Olga Natkovich et al. | |

It is certified that error appears in the above-identified patent and that said Letters Patent is hereby corrected as shown below:

In column 4, line 21, after "130-131" insert -- . --.

In column 4, line 52, delete "(SMGL)," and insert -- (SGML), --, therefor.

In column 8, line 28, delete "UNTIX" and insert -- UNIX --, therefor.

In column 18, line 14, in claim 15, after "of the" delete "of the".

In column 18, line 54, in claim 19, after "of the" delete "of the".

Signed and Sealed this
Twelfth Day of April, 2011

David J. Kappos
*Director of the United States Patent and Trademark Office*